(12) United States Patent
Ott et al.

(10) Patent No.: US 8,312,861 B2
(45) Date of Patent: Nov. 20, 2012

(54) ENGINE BRAKE DETECTION

(75) Inventors: Erik Ott, Sollebrunn (SE); Jonas Nilsson, Ytterby (SE)

(73) Assignee: Volvo Lastvagnar AB, Göteborg (SE)

(*) Notice: Subject to any disclaimer, the term of this patent is extended or adjusted under 35 U.S.C. 154(b) by 410 days.

(21) Appl. No.: 12/739,157

(22) PCT Filed: Oct. 22, 2008

(86) PCT No.: PCT/SE2008/000609
§ 371 (c)(1),
(2), (4) Date: Apr. 23, 2010

(87) PCT Pub. No.: WO2009/054770
PCT Pub. Date: Apr. 30, 2009

(65) Prior Publication Data
US 2010/0258079 A1    Oct. 14, 2010

(30) Foreign Application Priority Data
Oct. 22, 2007   (SE) ...................... 0702340

(51) Int. Cl.
F02D 13/04   (2006.01)
(52) U.S. Cl. .................................. 123/321
(58) Field of Classification Search ........... 123/320–323, 123/345–348, 559.1–559.2, 90.15; 701/107, 701/110, 112; 73/114.06, 114.24, 114.26, 73/114.69
See application file for complete search history.

(56) References Cited

U.S. PATENT DOCUMENTS

| | | | |
|---|---|---|---|
| 4,537,169 A | 8/1985 | Tsuge | |
| 5,335,636 A * | 8/1994 | Bilei et al. | 123/321 |
| 6,216,668 B1 | 4/2001 | Haugen | |
| 2006/0060166 A1 | 3/2006 | Huang | |
| 2007/0111853 A1 | 5/2007 | King et al. | |
| 2008/0092836 A1 * | 4/2008 | Mutti et al. | 123/90.16 |

FOREIGN PATENT DOCUMENTS

| | | |
|---|---|---|
| DE | 102005059403 A1 | 6/2007 |
| EP | 1243778 A2 | 9/2002 |
| SE | 468132 B | 11/1992 |
| WO | 9108381 A1 | 6/1991 |
| WO | WO03002862 A1 | 1/2003 |
| WO | 03031778 A1 | 4/2003 |
| WO | 2008048385 A1 | 4/2008 |

OTHER PUBLICATIONS

Supplementary European Search Report Application No. EP 08 84 1945.
International Search Report for corresponding International Application PCT/SE2008/000609.

* cited by examiner

Primary Examiner — Hai Huynh
(74) Attorney, Agent, or Firm — WRB-IP LLP

(57) ABSTRACT

In a method for reducing engine vibrations during engine braking with a malfunctioning engine brake, the engine brake includes an arrangement for altering a timing of at least one exhaust valve and an arrangement for varying an exhaust gas back pressure. The method includes detecting piston acceleration for each cylinder in the engine during the use of the engine brake, comparing the detected piston acceleration with a predetermined reference value, decreasing exhaust gas back pressure during engine braking if at least one piston is detected with a piston acceleration deviating more than a predefined amount from the predetermined reference value so that the piston acceleration will be falling within the predefined amount from the predetermined reference value.

16 Claims, 8 Drawing Sheets

ENGINE BRAKE DETECTION

BACKGROUND AND SUMMARY

The present invention relates to a method for detecting a malfunctioning engine brake and a method for eliminating vibrations during engine braking with a malfunctioning engine brake.

An exhaust valve mechanism in an internal combustion engine, comprising at least one exhaust valve in each cylinder, a rocker arm shaft-mounted rocker arm for each cylinder for operating the exhaust valve, a cam shaft with a cam element for each rocker arm, said cam element cooperating with motion transmitting means at one end of the rocker arm, a first piston-cylinder device disposed between an opposite end of the rocker arm and the exhaust valve, said first piston-cylinder device having a first cylinder chamber in said opposite rocker arm end, a hydraulic circuit for supplying and draining off pressure fluid to and from said cylinder chamber, and a piston disposed in said cylinder chamber, said piston being biased towards the exhaust valve when pressure fluid is supplied to the cylinder chamber.

SE-A-468 132 describes an exhaust valve mechanism of the above mentioned type which, together with a special type of camshaft with exhaust cams with extra lobes can be used to increase the engine braking power. The extra cam lobes are dimensioned so that their lifting height corresponds to the normal valve play of the valve mechanism. By reducing, by means of the piston cylinder device, the valve plate to zero, one or more extra lifts of the exhaust valve corresponding to the normal valve play can be achieved during a suitable time interval. For example, an extra cam lobe can be placed in relation to the regular cam lobe so as to provide an extra exhaust valve lift during a later part of the compression stroke, resulting in a loss of a portion of the compression work during the compression stroke which will not be recovered during the expansion stroke. This increases the braking effect of the engine.

In an engine with such an arrangement, the maximum lift height of the exhaust valve during the compression when engine braking, is limited to the valve play. Furthermore, the overlap of the exhaust valve and the intake valve in braking mode increases by virtue of the fact that the maximum lift height of the exhaust valve increases by a distance corresponding to the valve play as compared to drive mode. Since the pressure in the exhaust manifold is much higher than the pressure in the intake manifold in braking mode (ca 5 bar on the exhaust side as opposed to ca 1 bar on the intake side), hot exhaust in an amount depending on the overlap will flow between the exhaust side and the intake side during braking mode, which will impair the engine cooling during braking mode as compared to driving mode, especially since fuel as a cooling medium for the injection nozzle is not available during braking mode. Finally, the exhaust rocker arm must be dimensioned more robustly for braking mode than for normal driving mode, since the opening force on the exhaust valve in braking mode must overcome the force from a high compression pressure in the cylinder, this force being substantially higher than the force on the valve required for normal opening during the exhaust stroke.

WO 03/002862 relates to a process and a control device of an engine comprising a barrier to decompression. The object of this invention is to increase the engine temperature as fast as possible. This is done by setting at least two cylinders in braking mode and at least two cylinders in non-braking mode (normal operation). The vibrations are kept at a minimum because at least two cylinders at a time are in the braking mode. Those cylinders are chosen in order to compensate for the other's vibrations It is a need in the art for a method which can detect a malfunctioning engine brake and a method for reducing or eliminating engine vibrations caused by said malfunctioned engine brake.

It is desirable to provide a method for detecting and reducing vibrations caused by a malfunctioning engine braking.

According to a first aspect of the invention it is provided a method for reducing engine vibrations during engine braking with a malfunctioning engine brake, where said engine brake comprising means for altering a timing of at least one exhaust valve and means for varying an exhaust gas back pressure, comprising the steps of: detecting piston acceleration for each cylinder in the engine during the use of said engine brake, comparing said detected piston acceleration with a predetermined reference value, decreasing exhaust gas back pressure during engine braking if at least one piston is detected with a piston acceleration deviating more than a predefined amount from said predetermined reference value so that said piston acceleration will be falling within said predefined amount from said predetermined reference value.

An advantage of an aspect of the present invention is that it may minimize the effect of the potentially high valve forces created by the malfunctioning engine brake.

Another advantage of an aspect of the present invention is that malfunctioning cylinders are detected and possibly stored for later use/knowledge when servicing the engine.

In another example embodiment of an aspect of the present invention said reference value is another detected piston acceleration measured during engine braking.

An advantage of this embodiment is that no extra reference values need to be determined beforehand.

In another example embodiment of an aspect of the present invention said detected piston has the highest piston acceleration.

An advantage of this embodiment is that it always ensures that maximum available engine brake power is utilized without vibrations although one or a plurality of engine brakes may be defective.

In another example embodiment of an aspect of the present invention said exhaust gas back pressure is decreased by increasing the passage of exhaust gases in the exhaust system.

An advantage of this embodiment is that built in devices may be used for restoring the engine back to normal operation.

In another example embodiment said exhaust gas back pressure is decreased by opening guide vanes in a variable geometry turbo unit.

An advantage of this embodiment is that a regulation of increased or decreased back pressure can easily be performed.

In still another example embodiment of an aspect of the present invention said exhaust gas back pressure is decreased by decreasing the charging pressure provided by a turbo charger.

An advantage of this embodiment is that it may further minimize the effect of high valve forces.

According to a second aspect of the present invention it is provided a method for decreasing engine vibrations during engine braking with a malfunctioning engine brake, where said engine brake comprising means for altering a timing of at least one exhaust valve and means for varying an exhaust gas back pressure, comprising the steps of: detecting piston acceleration for each cylinder in the engine during the use of said engine brake, comparing said detected piston acceleration with a predetermined reference value, adjusting a valve play in a device for operating said exhaust valve during said engine braking if at least one piston is detected with a piston acceleration deviating more than a predefined amount from said predetermined reference value so that said piston acceleration will be falling within said predefined amount from said predetermined reference value.

In another example embodiment of an aspect of the present invention said device for operating said exhaust valve during engine braking is a hydraulic circuit and said adjustment is performed by altering a fluid pressure in said hydraulic circuit.

In still another example embodiment of an aspect of the present invention said device for operating said exhaust valve during engine braking is a mechanical slipping eccentric device which can be rotated in a suitable direction for achieving a correct exhaust valve play during engine braking which will cause a piston acceleration falling within said predefined amount from said predetermined reference value.

In still another example embodiment of an aspect of the present invention said device for operating said exhaust valve during engine braking is a mechanical slipping eccentric device which can be rotated in a suitable direction for achieving a correct exhaust valve play during engine braking which will cause a piston acceleration falling within said predefined amount from said predetermined reference value.

In still another example embodiment of an aspect of the present invention said reference value is another detected piston acceleration measured during engine braking.

In still another example embodiment of an aspect of the present invention said detected piston has the highest piston acceleration.

In still another example embodiment of an aspect of the present invention said exhaust gas back pressure is decreased by increasing the passage of exhaust gases in the exhaust system.

In still another example of an aspect of embodiment of the present invention said exhaust gas back pressure is decreased by opening guide vanes in a variable geometry turbo unit.

In still another example embodiment of the present invention said exhaust gas back pressure is decreased by decreasing the charging pressure provided by a turbo charger.

According to a third aspect of the present invention it is provided a method for detecting a malfunctioning engine brake, where said engine brake comprising means for altering a timing of at least one exhaust valve and means for varying an exhaust gas back pressure, comprising the steps of: detecting piston acceleration for each cylinder in the engine during and/or after the use of said engine brake, comparing said detected piston acceleration with a predetermined reference value, alerting during and/or after the engine braking if at least one piston is detected with a piston acceleration deviating more than a predefined amount from said predetermined reference value.

In still another example embodiment of an aspect of the present invention said alerting comprises the step of sending a signal to an ECU (Electronic Control. Unit) that one or a plurality of engine brakes are malfunctioning and/or sending a signal to the driver while driving a vehicle having an engine with said malfunctioning engine brake.

BRIEF DESCRIPTION OF THE DRAWINGS

The invention will be described in more detail below with reference to examples shown in the accompanying drawings, where.

DETAILED DESCRIPTION

An exhaust gas pressure regulator for regulating the exhaust gas back pressure may be provided after the exhaust manifold but before the tail pipe in the exhaust system. The exhaust gas pressure regulator may be of butterfly type, i.e., a butterfly is provided in the exhaust system and regulated by en electrical or hydraulic engine so that the opening in the exhaust system may be increased or decreased on demand. The opening may be at any position between fully open and fully closed including the fully opening and fully closed positions. Another restricting means in the exhaust system may be a piston which is moved in to or out of the exhaust system. When said piston is in a fully out position the opening area in the exhaust system is greatest and when the piston is in its fully in position the opening area may be partly of fully closed. Any position between fully closed and opened may be chosen on demand. Yet another possible variable restricting means may be a plate instead of said piston, the functionality is the same as with the piston the only difference is the shape of the moving part.

Figure 1:
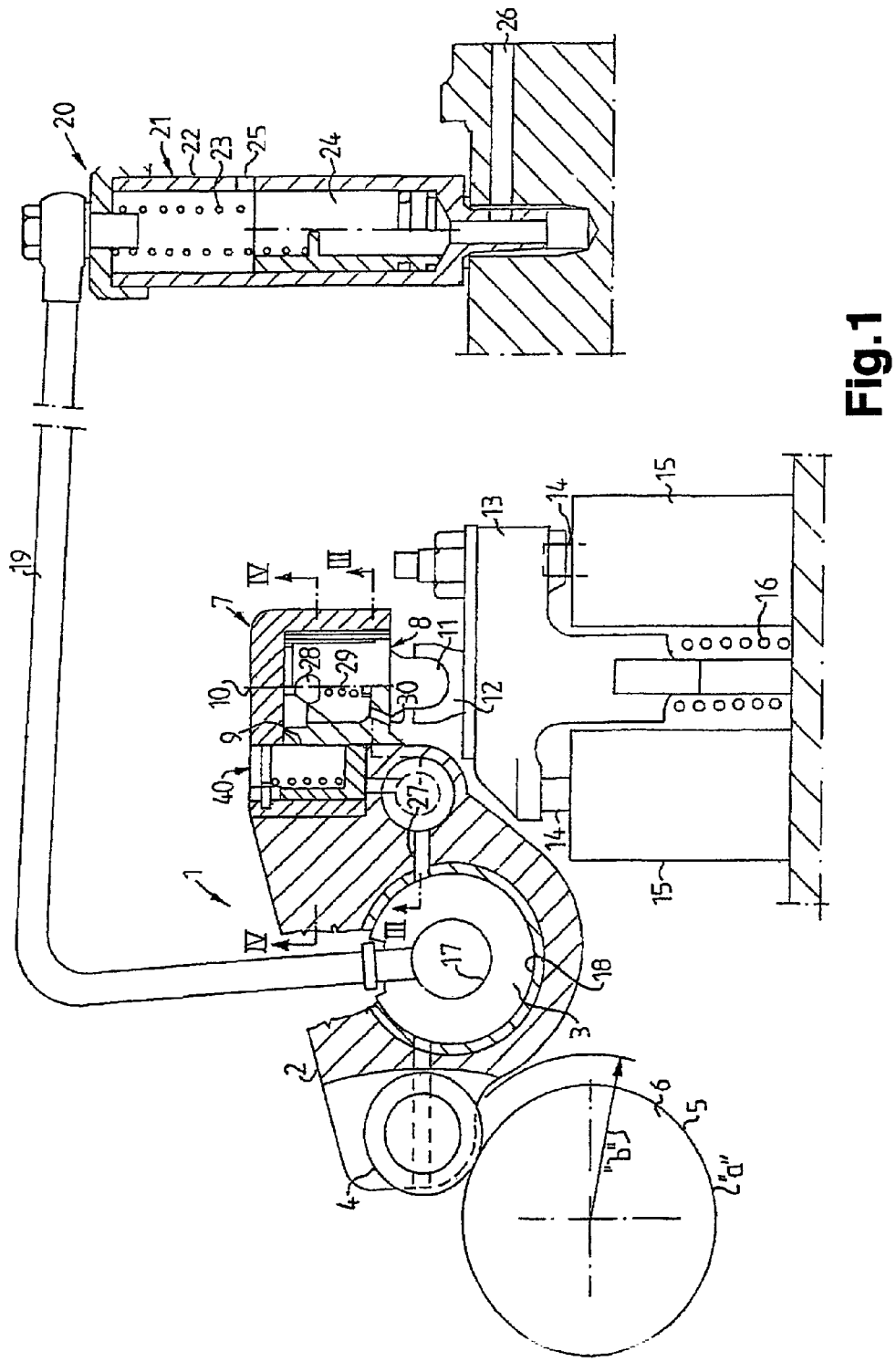
FIG. 1 shows a side view of one embodiment of an exhaust valve mechanism according to the invention with a longitudinal section through the exhaust valve rocker arm for regular valve lifting during driving mode but without the rocker arm for braking mode.

FIG. 1 shows schematically a valve mechanism 1 in an internal combustion engine (not shown). The mechanism 1 comprises an exhaust valve rocker arm 2, which is rockably mounted on a rocker arm shaft 3. One end of the rocker arm 2 has a cam follower roller 4, rotatably mounted thereon. The cam follower roller 4 is in contact with a schematically shown cam element 5 on the camshaft 6. The designation "a" indicates the base circle of the cam element 5, and "b" designates its top radius. At its end 7 opposite to the end with the cam follower roller 4, the rocker arm 2 is provided with a piston cylinder device 8 comprising a cylinder chamber 9 formed in the rocker arm end 7 and a piston 10 housed in the cylinder chamber. The piston 10 is provided with a piston pin 11 with a spherical end extending into a socket 12 on a yoke 13 which, during operation, applies pressure to two exhaust valve spindles 14.15 designates two valve springs for closing the valves.

Beyond the springs 15 there is an additional spring 16, which is designed to keep the yoke 13 in such a position that the play, which is always present in a valve mechanism of this type, is disposed between the ends 14 of the spindles and the underside of the yoke 13.

The valve mechanism 1 described is lubricated by pressurized oil which is supplied by the engine oil pump via channels in the engine block and the cylinder head (not shown) to a channel 17 in the rocker arm shaft 3. The rocker arm 2 has journal bearings 18, which are lubricated by a minor leakage flow between the shaft 3 and the bearing 18. The excess oil is returned via a return line 19, in a hydraulic circuit generally designated 20, which contains a valve device 21 comprising a valve housing 22 and a valve element 24 biased by a spring 23. The housing 22 has an outlet 25 through which return oil flows back to the engine oil sump, when the valve element is in the position shown in FIG. 1. The housing 22 also has an inlet 26 for a pressure medium (compressed air or hydraulic fluid). When pressure medium is supplied through the inlet 26, the valve element 24 is biased upwards in FIG. 1, thereby closing the outlet 25 and blocking the return flow through the line 19.

The result will be that the pressure in the channel 17 rises. The channel 17 communicates via a channel 27 with the cylinder chamber 9 above the piston 10, which leads to the piston being loaded downwards towards the valve yoke 13 so that the play between the yoke and the upper end surfaces of the valve spindles is adjusted down to zero. In the piston 10 there is a relief valve, which limits the pressure to a predetermined level. If this level is exceeded, the valve 28, 29 opens so that oil can drain out through channels 30 in the piston.

Figure 3:
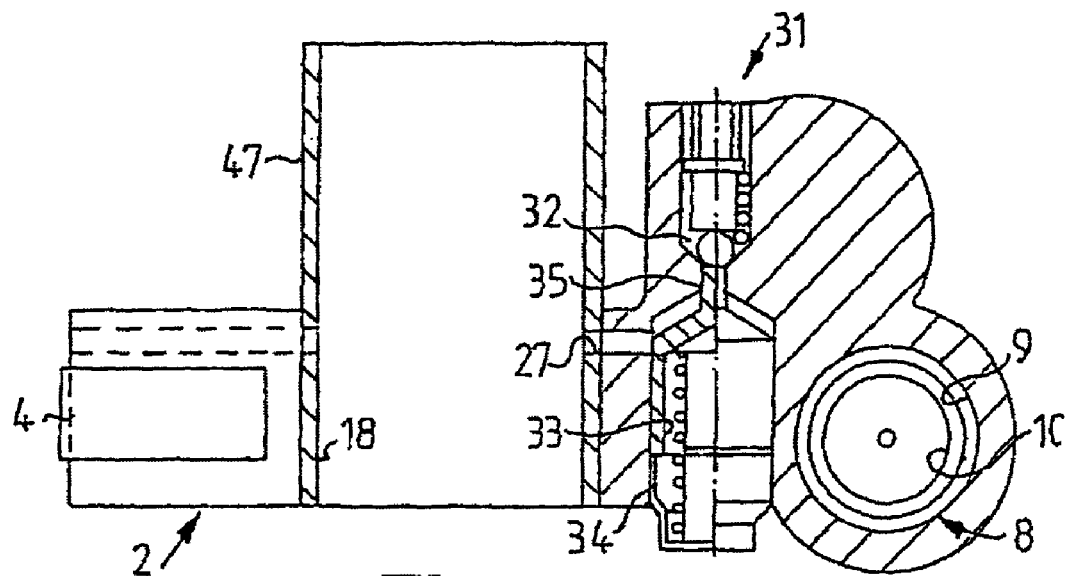
FIG. 3 shows a section through the rocker arm in FIG. 1 along the line III-III.

In order to prevent the pumping of oil between the cylinder chamber 9 and the chamber 17 in the rocker arm shaft during operation with zero valve play, a one-way valve 31 (FIG. 3) is arranged in the rocker arm channel 27. The one-way valve 31 comprises a valve element 32 in the form of a ball which, when there is high pressure in the hydraulic circuit, is held in its closed position by the pressure in the cylinder chamber 9 and by a spring. The pressure in the hydraulic circuit acts also against the end of a piston 34 biased by a spring 33. The piston 34 has a shaft 35 extending to the seat of the ball 32. When there is high pressure in the circuit, i.e. when the valve 21 is closed, the pressure will keep the piston 34 in a position with the end of the shaft 35 at a distance from the ball 32, thereby keeping the valve closed. When the valve 21 opens the return line 19, the oil pressure drops and when the force on the piston caused by the oil pressure exceeds the force from the spring 33, the shaft 35 will push the ball 32 away so that the valve opens and the cylinder chamber 9 is put in communication with the return line 19.

The features hitherto described with reference to FIG. 1 are background art.

Figure 2:
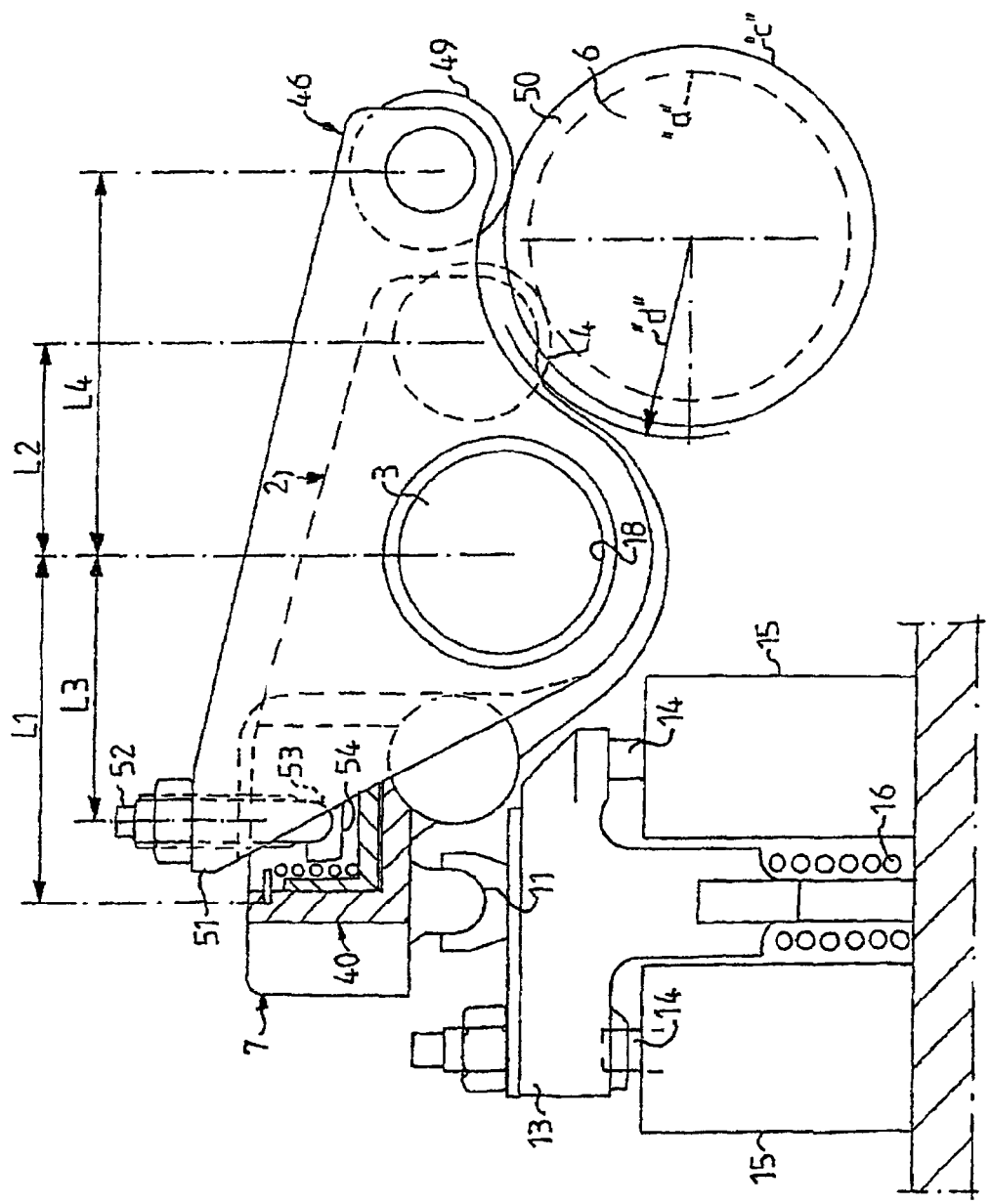
FIG. 2 shows a side view, mirror reversed in relation to FIG. 1, of the valve mechanism according to the invention with the rocker arm for braking mode and with the rocker arm for regular valve lift partially in section.

According to the present invention, the exhaust rocker arm 2 is made with a second piston cylinder device 40 comprising a cylinder chamber 41 spaced from the rocker arm end 7 and a piston 42 disposed in the cylinder chamber. As can be seen in the figures, the cylinder chamber 41 is essentially directed opposite to the cylinder chamber 9, i.e. it opens upwards as seen in FIGS. 1 and 2 and communicates with the first cylinder chamber via a channeh48. As is particularly evident from FIG. 2, the piston 42 is concave as is the piston 10. Between the bottom 43 of the depression in the piston 42 and a lock ring 44, a helical spring 45 is tensioned, thereby loading the piston 42 towards the bottom of the cylinder chamber 41. A second exhaust rocker arm 46 is mounted on a laterally extending portion 47 of the bearing bushing 18 non-rotatably joined to the first exhaust rocker arm 2 (see FIGS. 3 and 4). At one end of the second rocker arm 46 there is a cam follower roller 49 rotatably mounted. The cam follower roller 49 is in contact with a schematically shown cam element 50 on the camshaft6."c" designates the base circle of the cam element and "d" its top radius. At its opposite end designated 51 an adjustable spindle 52 is screwed in, which extends into the depression of the piston 42 and has a spherical end 53 held in a corresponding depression in a guide 54.

Figure 4:
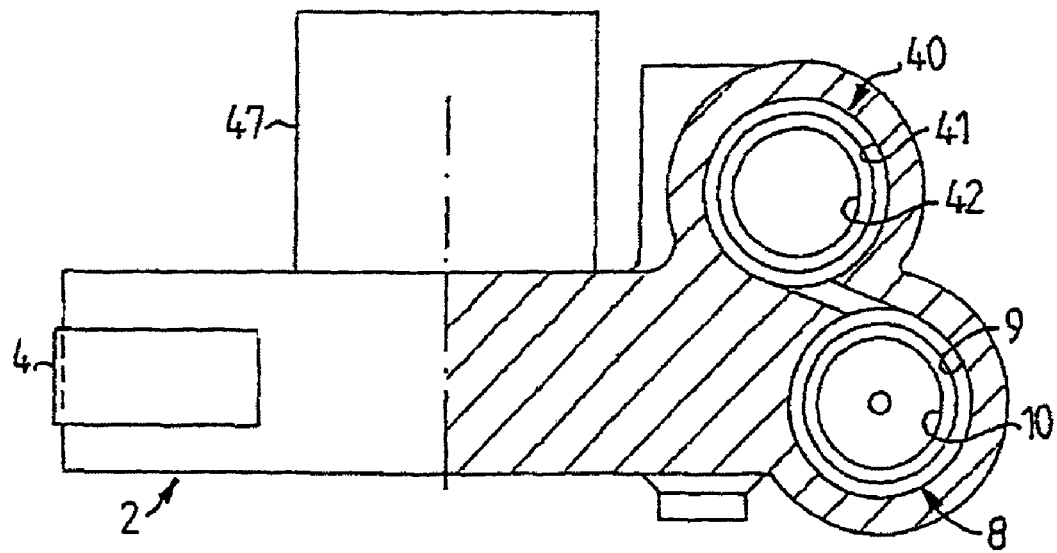
FIG. 4 shows a section through the rocker arm in FIG. 1 along the line IV-IV.

As is particularly evident from FIG. 4, in the example shown the cylinder chamber 4I has the same cross-sectional area as the cylinder chamber 9, which means that a pump stroke with a certain stroke length of the piston 42 results in the same stroke length in the piston 10. Other embodiments with different cross-sectional areas for the cylinder chambers 9 and 41 are conceivable, but the stroke lengths for the pistons 10 and 42 will then be inversely proportional to their cross-sectional areas. The reactive forces, which can be different, from the two cylinder chambers 9 and 41, form together with the lever lengths L1 and L3 a resulting reactive torque in the rocker arm 2. The mechanical advantage of the rocker arms 2 and 46 differ however, firstly, by virtue of the fact that the cylinder chambers 9,41 are placed at different distances from the rocker arm shaft 2 and, secondly, by virtue of the fact that the cam follower rollers 4 and 49 are mounted on their respective rocker arms at different distances from the rotational axis of the rocker arm. In the example shown in FIG. 2, the ratio L2/L1 of the exhaust rocker arm 2 is ca 1: 1.6, while the ratio L4/L3 of the exhaust rocker arm 46 is ca 1:0.7. A suitable interval for the mechanical advantage of the rocker arm 2 can be ca 1:1.1-1.6 and for the mechanical advantage of the rocker arm 46 ca 1:0.7-1.1.

In normal drive mode operation, the valve 21 is open and the pistons 10 and 42 lie in their end positions shown in FIGS. 1 and 2. The transition to braking mode is effected by closing the valve 21 so that the pressure is built up in the hydraulic circuit 20. The piston 10 is thereby displaced downwards to adjust the valve play to zero at the same time as the piston 42 is displaced upwards to an upper end position abutting against the lock ring 44.

The brake cam element 50 can be provided with, for example, one or two (not shown) cam lobes with the top radius "d" shown in FIG. 2, either only one for opening the exhaust valve 14 at the end of the compression stroke (the decompression) or one for opening the exhaust valve 14 at the last portion of the intake stroke (the charging) and one for opening the exhaust valve 14 at the end of the compression stroke (the decompression). During the angular interval, when first the first and then the second of these brake cam lobes strikes the cam follower roller 49 of the rocker arm 46 and the rocker arm 46 thereby presses against the piston 42 so that oil is pumped into the cylinder chamber 9 behind the piston 10 to press it down and open the exhaust valve, the cam follower roller 4 of the regular exhaust rocker arm 2 lies on the base circle "a" of the cam element 5. By virtue of the above described difference in the leverage of the two rocker arms 2 and 46, there will be a limited reactive torque in the regular rocker arm 2, which is continually taken up by its cam follower roller 4 on the base circle "a" of the cam element 5 during charging and decompression. The regular exhaust rocker arm 2 thus does not move on its own during the charging and decompression, which is advantageous for the bearing bushing 18 since it cannot be subjected to load on one edge. The design results in the two rocker arms 2 and 46 together taking up the loads during the charging and decompression sequence, even if the extra exhaust valve rocker arm 46, for brake mode operation, has to absorb the major part of the load and perform the work of opening the exhaust valves.

For different reasons one or a plurality of pistons 10 may be stuck in the downward position even after having opened valve 21, i.e., no more engine brake demand. This may cause vibrations when the engine is running because only one or a few of the exhaust valves are affected by the engine brake mode operation, i.e., rocker arm 46 is affecting the exhaust valves.

If the valve clearance between the rocker arm 46 and the exhaust valve is wrong, too large, this may lead that the exhaust valve affected by said rocker arm 46 may not be opened sufficiently. One way of decreasing or eliminating the resulting vibrations may be to decrease the exhaust gas back pressure. Said exhaust gas back pressure may be decreased by increasing the passage of exhaust gases in the exhaust system. A butterfly or other movable parts, such as pistons or sliding walls, may be provided between an exhaust manifold and the end pipe for altering said exhaust gas back pressure. If a turbo unit is provided in the exhaust system the boost pressure may be decreased during such circumstances. If said turbo unit has a variable geometry, said geometry may be altered so that exhaust gas back pressure is decreased.

Another way may be to provide a mechanical slipping eccentric between the rocker arm 46 and the shaft 3. For instance the bushing 18 may be eccentric and mechanically couple to an arm which in turn is coupled to an electrical motor. When the slipping eccentric is moved in a suitable manner the play between the rocker arm 46 and the exhaust valve may be correct so that rocker arm 46 is affecting the exhaust valve in a correct manner, i.e., equal engine brake power as the other cylinders.

Figure 5:
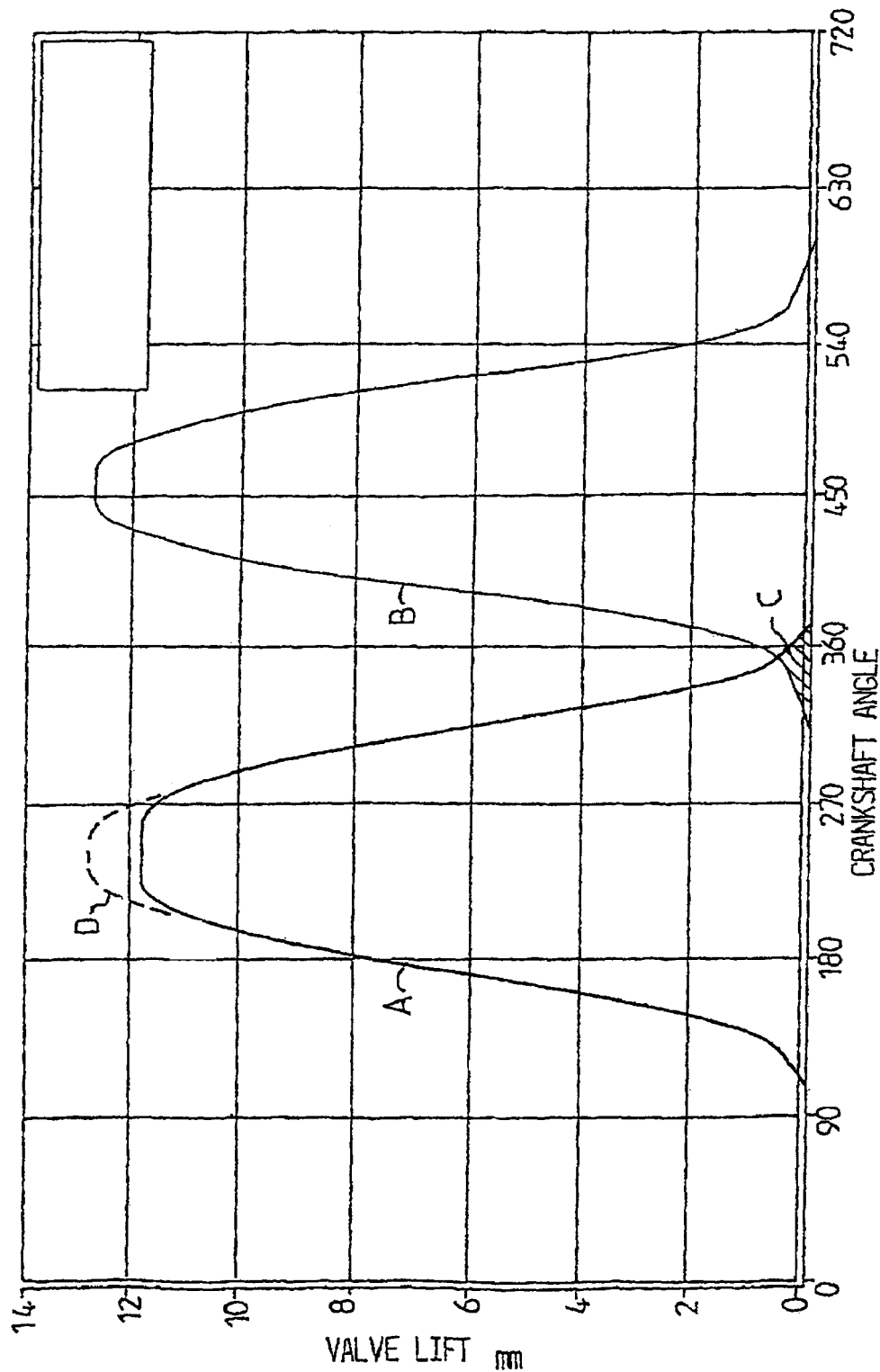
FIG. 5 is a diagram illustrating the lifting curves of the exhaust valve and of the intake valve in normal driving mode.
Figure 6:
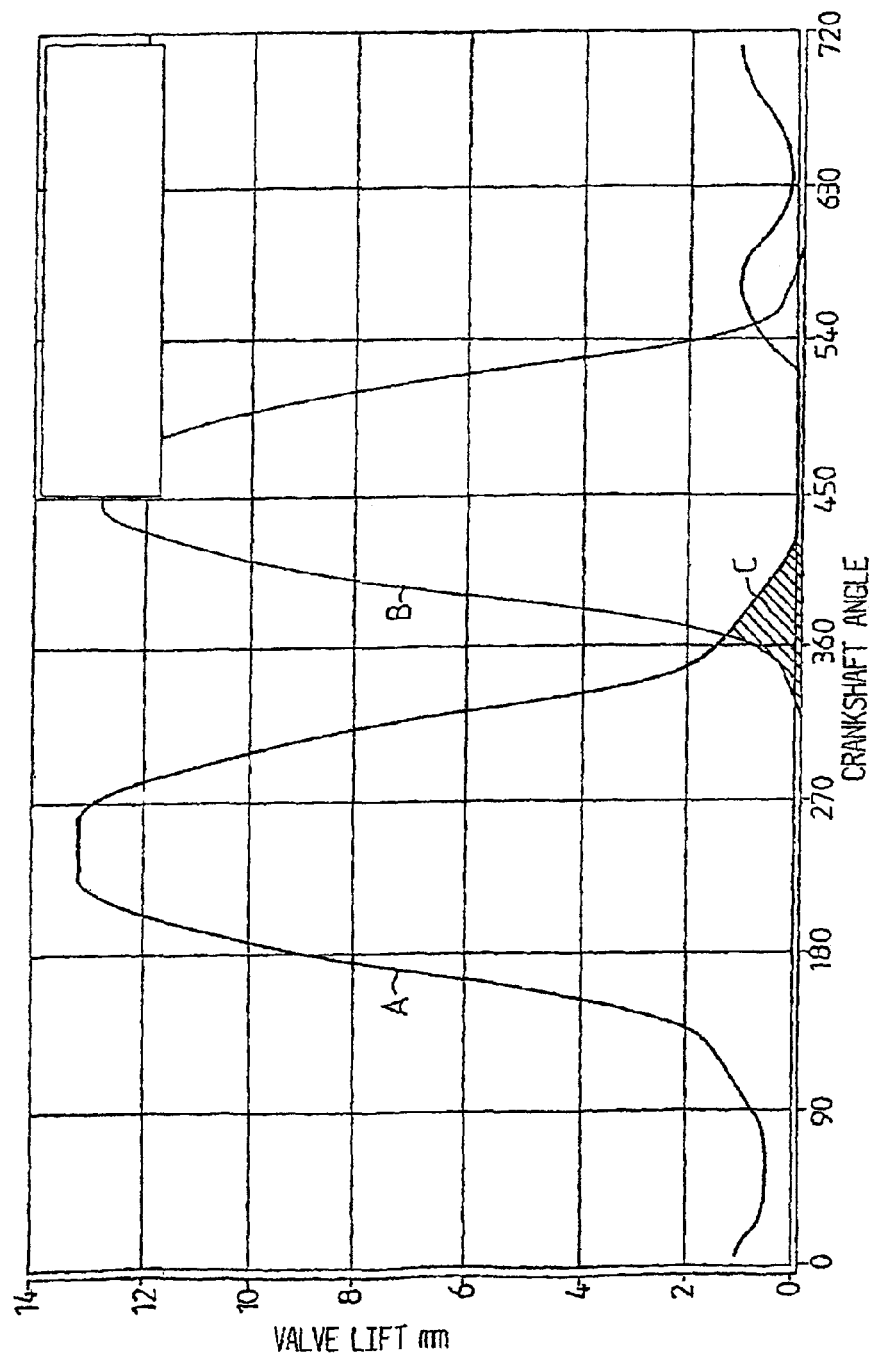
FIG. 6 is a corresponding diagram during braking mode with the described previously known exhaust valve mechanism.

The diagram of FIG. 5 shows the lift curve A of the exhaust valve and the lift curve B of the intake valve during normal drive mode operation. As can be seen by the shaded area C, the valve overlap is relatively small. The dashed line D illustrates the increase in exhaust valve lift when going from driving mode to-braking mode by adjusting down the valve play to zero and using the described previously known technology with extra cam lobes on the regular cam. As is evident from the diagram in FIG. 6, showing the lift curves A and B during braking mode while using the described known technology, the valve overlap C increases markedly as compared to driving mode. This in turn leads to, as mentioned above, a relatively significant back-flow from the exhaust side to the intake side.

Figure 7:
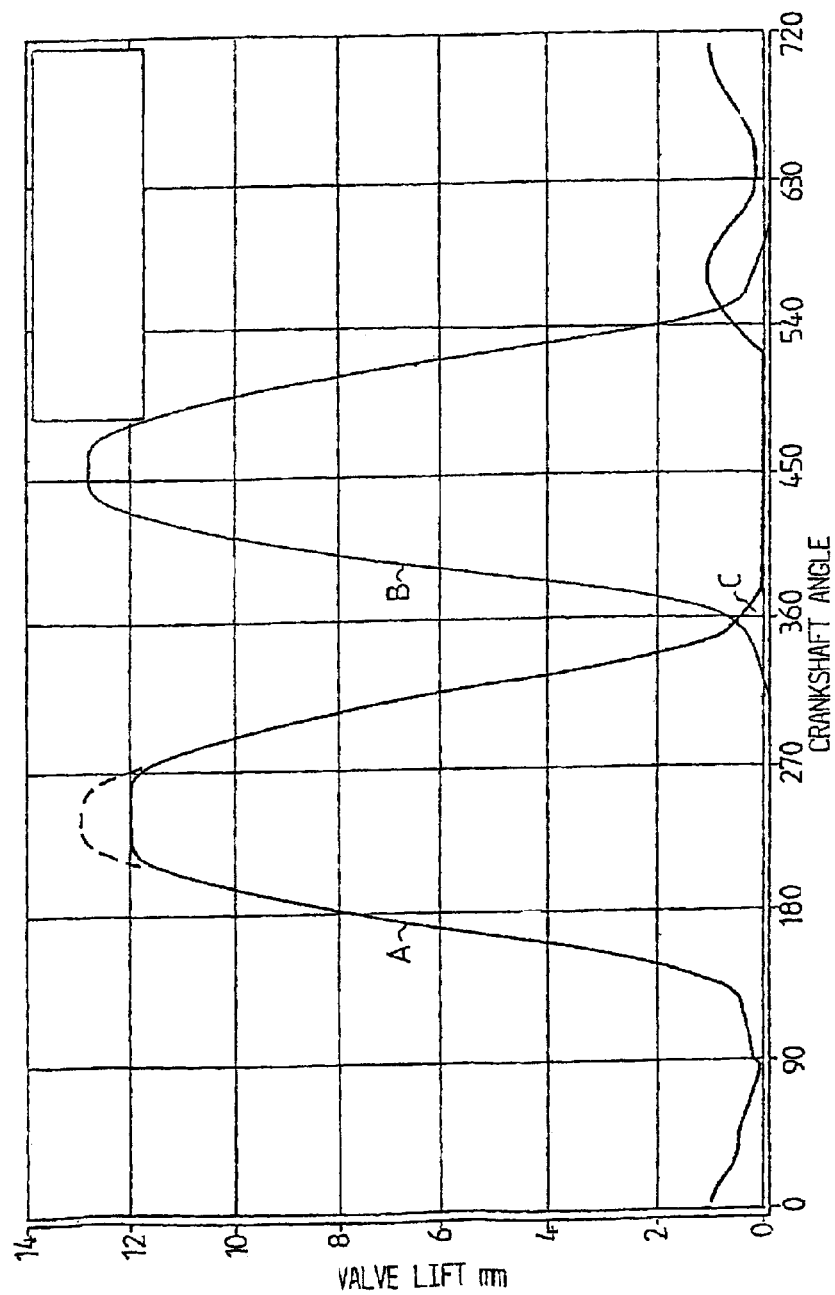
FIG. 7 is a corresponding diagram during braking mode with the valve mechanism according to the present invention.

The diagram in FIG. 7 shows the lift curve A of the exhaust valve and the lift curve B of the intake valve during braking mode, using a valve mechanism 1 according to the present invention. As can be seen by a comparison with FIG. 5, in this case there is no change in the regular lift curve A of the exhaust valve when changing from drive mode to brake mode and, consequently, the valve overlap C does not change, as can be seen by comparison.

The diagrams in FIGS. 6 and 7 reveal, when compared, that the extra lifts A1, A2 during brake mode are of equal height. The lifting height when using the described known technology is limited to the valve play, in practice at most ca 1 mm. The lift height when using the valve mechanism according to the invention is limited to what the space between the valve disc and the top of the piston permit, when the piston is in its uppermost position, and can be appreciably higher than that shown. Furthermore, the valve mechanism according to the invention can absorb greater forces than the previously known valve mechanism, which means that a higher differential pressure can be permitted over the exhaust valve, ca 70 bar as compared to ca 45 bar previously. With 5 bar of counter-pressure in the exhaust manifold, this means that the compression pressure can be allowed to be raised from ca 50 bar to ca 75 bar, which corresponds to an increase in the braking power by ca 30%.

Figure 8A:
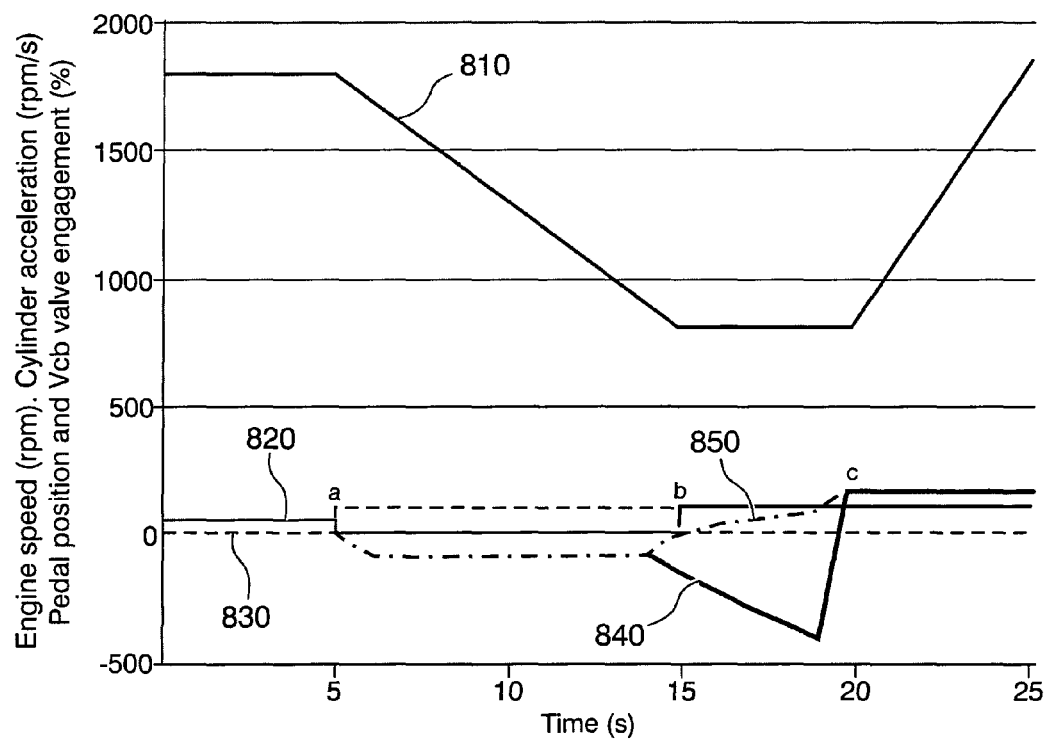
FIGS. 8a and 8b illustrate engine speed, cylinder acceleration, pedal position and valve engagement as a function of time when engine braking.
Figure 8B:
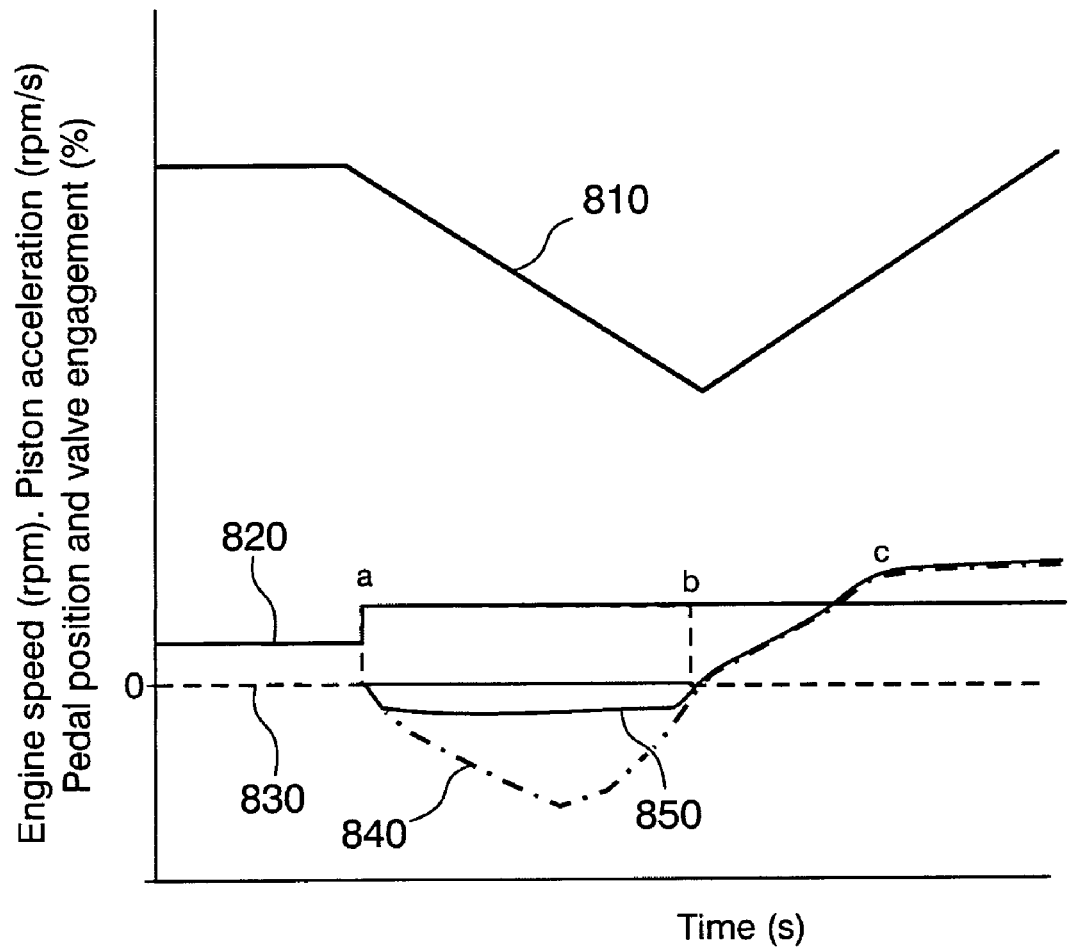

If the engine brake is malfunctioning, because inter alia of a sticking exhaust valve or too large valve clearance, the engine will have more or less vibrations when running depending on the severity of said malfunctions. Defective engine brake may be detected by measuring the piston acceleration for each cylinder. The piston acceleration may be measured by looking at a high resoluted signal of the crank shaft speed. The crank shaft speed will have distinct acceleration points representing the ignition points of the cylinders. The acceleration is inter alia depending on the power demand from the driver. This acceleration of the cylinders may be used to detect any problems with the engine brake. FIG. 8a and FIG. 8b illustrate schematically the engine speed, cylinder acceleration, pedal position and valve engagement as a function of time for a 6 cylinder in line diesel engine. In said figure it is also depicted when engine brake is demanded.

Engine speed, and thereby piston speed, may be monitored by well known crankshaft sensors. In FIG. 8a land 8b line 810 represents the engine speed, line 820 represents the accelerator pedal position, line 830 represents engine brake activation (non active when at 0 and active above 0), line 840 represents a defective piston acceleration (for instance cylinder 6), line 850 represents non-defective piston acceleration (for the remaining cylinders, i.e., cylinders 1-5 in a 6 cylinder engine).

Between time 0 and a in FIG. 8a the engine is running under normal conditions, i.e., no engine brake the RPM at constant speed around 1800 rpm and the accelerator pedal depressed sufficiently to achieve a desired speed of the vehicle. Between time a and b in FIG. 8a the engine brake is activated illustrated by the line 830 increasing from 0 to above 0. During engine braking the RPM of the engine is decreased illustrated by the negative slope of line 810. The accelerator pedal between time a and b is set to zero, i.e., no power demand. Piston acceleration is decreasing during the first period between a and b and after said period said piston acceleration is constant. Between time b and c when the accelerator pedal is pressed down in order to demand power from the engine, piston acceleration for piston 1-5 is increasing illustrated by line 850. However, one piston acceleration is decreasing due to a malfunctioning engine brake. In this case cylinder no. 6, illustrated by line 840, is still in braking mode despite the fact that the braking demand has been released. The reason may be a stuck means for operating the exhaust valve due to air in the hydraulic system or imperfect machining or wear in the mechanical parts affecting the exhaust valve. When only one or a few but not all cylinders are in a braking mode there will be vibrations due to differentiated power from on the first hand cylinders in normal operation and on the other hand cylinders in braking mode. The difference in piston acceleration can be detected by a crank shaft speed sensor. This sensor is able to determine which one of the cylinders is defective.

Between time 0 and a in FIG. 8b the engine is running under normal conditions, i.e., no engine brake the RPM at constant speed and the accelerator pedal depressed sufficiently to achieve a desired speed of the vehicle.

Between time a and b in FIG. 8b the engine brake is activated illustrated by the line 830 increasing from 0 to above 0. During engine braking the RPM of the engine is decreased illustrated by the negative slope of line 810. The accelerator pedal between time a and b is set to zero, i.e., no power demand. Piston acceleration is decreasing a certain amount for all cylinders a period between a and b and after said period the piston acceleration for cylinder 1-5 is constant while for cylinder No. 6 starts to deviate from the other cylinders. The reason for this deviation of cylinder 6 from the other cylinder may be a wrong valve clearance for the rocker arm actuating the exhaust valve in the engine brake mode. If for instance the valve clearance is to large, the exhaust valve will start to open later than if the valve clearance was smaller and correctly adjusted. If the exhaust valve is to be opened later than normally the pressure inside the cylinder may be too high for the exhaust valve to be opened, i.e., the pressure acting on the exhaust valve in the engine brake mechanism is lower than the pressure inside the cylinder. This will cause the valve to be left closed or partly closed, meaning that the engine brake for this cylinder is less than the engine brake provided by the other cylinders. This difference in engine brake between the cylinders will cause vibrations. This difference in engine brake power between the cylinders due to wrongly set valve clearance may be evened out by reducing the back pressure in the exhaust system or by reducing the valve clearance during braking for the deficient cylinder.

Between time b and c when the accelerator pedal is pressed down in order to demand power from the engine, piston acceleration for all pistons 840, 850 are equal.

When the accelerations of the pistons are detected during engine braking, said accelerations are compared with predetermined values of piston accelerations. If a detected acceleration value is falling outside a predetermined acceleration interval the exhaust gas back pressure may be decreased. The back pressure may be decreased until the acceleration of all pistons are within said predetermined value of piston acceleration.

Instead of comparing with a predetermined value one may compare the factual piston accelerations. If one or more piston accelerations are lower than the other the exhaust gas back pressure may be decreased until all cylinders are within a predetermined acceleration interval. The exhaust gas back pressure may be decreased by opening the restrictor arranged in the exhaust system downstream the exhaust manifold. A specific amount of piston acceleration outside said piston acceleration interval may correspond to a specific change in exhaust flow area, i.e., it is determined beforehand which amount of detected piston acceleration will correspond to a specific change of restricting area. Another way of finding the correct opening area in the exhaust system is to use a feed back loop, i.e., a small increase in exhaust opening will correspond to a certain detected piston acceleration. After a number of small consecutive increased exhaust openings have been performed, the piston acceleration will fall within said predetermined range of piston accelerations.

In another example embodiment of the present invention it is provided a method for detecting a malfunctioning engine brake, where said engine brake comprising means for altering a timing of at least one exhaust valve and means for varying an exhaust gas back pressure, comprising the steps of: detecting piston acceleration for each cylinder in the engine during the use of said engine brake, comparing said detected piston acceleration with a predetermined reference value, alerting during engine braking if at least one piston is detected with a piston acceleration deviating more than a predefined amount from said predetermined reference value. Said alerting may comprise the step of sending a signal to an ECU (Electronic Control Unit) that one or a plurality of engine brakes are malfunctioning and/or sending a signal to the driver while driving a vehicle having an engine with said malfunctioning engine brake.

The invention claimed is:

1. A method for reducing engine vibrations during engine braking with a malfunctioning engine brake, where the engine brake comprising means for altering a timing of at least one exhaust valve and means for varying an exhaust gas back pressure, comprising:
   detecting piston acceleration for each cylinder in the engine during the use of the engine brake,
   comparing the detected piston acceleration with a predetermined reference value,
   decreasing exhaust gas back pressure during engine braking if at least one piston is detected with a piston acceleration deviating more than a predefined amount from the predetermined reference value so that the piston acceleration will be falling within the predefined amount from the predetermined reference value.

2. The method according to claim 1, wherein the reference value is another detected piston acceleration measured during engine braking.

3. The method according to claim 2, wherein the detected piston has the highest piston acceleration.

4. The method according to claim 1, wherein the exhaust gas back pressure is decreased by increasing the passage of exhaust gases in the exhaust system.

5. The method according to claim 1, wherein the exhaust gas back pressure is decreased by opening guide vanes in a variable geometry turbo unit.

6. The method according to claim 1, wherein the exhaust gas back pressure is decreased by decreasing the charging pressure provided by a turbo charger.

7. A method for decreasing engine vibrations during engine braking with a malfunctioning engine brake, where the engine brake comprising means for altering a timing of at least one exhaust valve and means for varying an exhaust gas back pressure, comprising:
   detecting piston acceleration for each cylinder in the engine during the use of the engine brake,
   comparing the detected piston acceleration with a predetermined reference value,
   adjusting a valve play in a device for operating the exhaust valve during the engine braking if at least one piston is detected with a piston acceleration deviating more than a predefined amount from the predetermined reference value so that the piston acceleration will be falling within the predefined amount from the predetermined reference value.

8. The method according to claim 7, wherein the device for operating the exhaust valve during engine braking is a hydraulic circuit and the adjustment is performed by altering a fluid pressure in the hydraulic circuit.

9. The method according to claim 7, wherein the device for operating the exhaust valve during engine braking is a mechanical slipping eccentric device which can be rotated in a suitable direction for achieving a correct exhaust valve play during engine braking which will cause a piston acceleration falling within the predefined amount from the predetermined reference value.

10. The method according to claim 7, wherein the reference value is another detected piston acceleration measured during engine braking.

11. The method according to claim 10, wherein the detected piston has the highest piston acceleration.

12. The method according to claim 7, wherein the exhaust gas back pressure is decreased by increasing the passage of exhaust gases in the exhaust system.

13. The method according to claim 7, wherein the exhaust gas back pressure is decreased by opening guide vanes in a variable geometry turbo unit.

14. The method according to claim 7, wherein the exhaust gas back pressure is decreased by decreasing the charging pressure provided by a turbo charger.

15. A method for detecting a malfunctioning engine brake, where the engine brake comprising means for altering a timing of at least one exhaust valve and means for varying an exhaust gas back pressure, comprising:

detecting piston acceleration for each cylinder in the engine during and/or after the use of the engine brake, comparing the detected piston acceleration with a predetermined reference value, alerting during and/or after the engine braking if at least one piston is detected with a piston acceleration deviating more than a predefined amount from the predetermined reference value.

16. The method according to claim 15, wherein the alerting comprises the step of sending a signal to an ECU (Electronic Control Unit) that one or a plurality of engine brakes are malfunctioning and/or sending a signal to the driver while driving a vehicle having an engine with the malfunctioning engine brake.

* * * * *